Jan. 15, 1935.  E. SOBOLEWSKI  1,987,978
BACK GEAR INTERLOCK
Filed Dec. 9, 1930  5 Sheets-Sheet 4
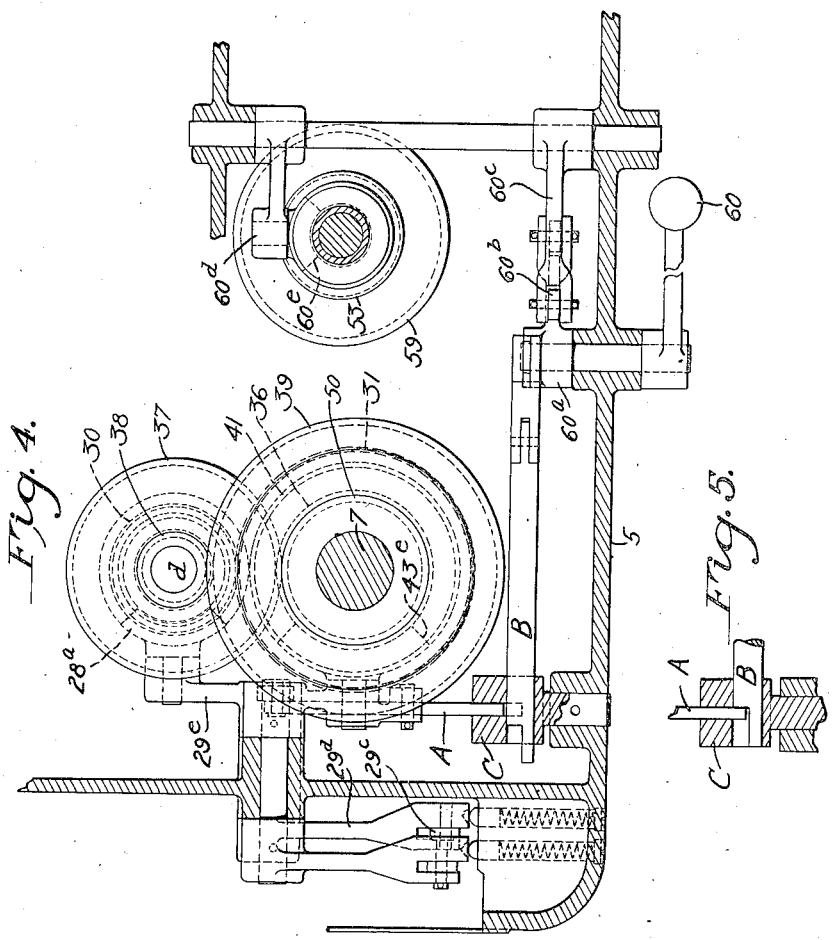
Inventor
Edward Sobolewski
By Attorneys
Nathan & Bowman Patented Jan. 15, 1935

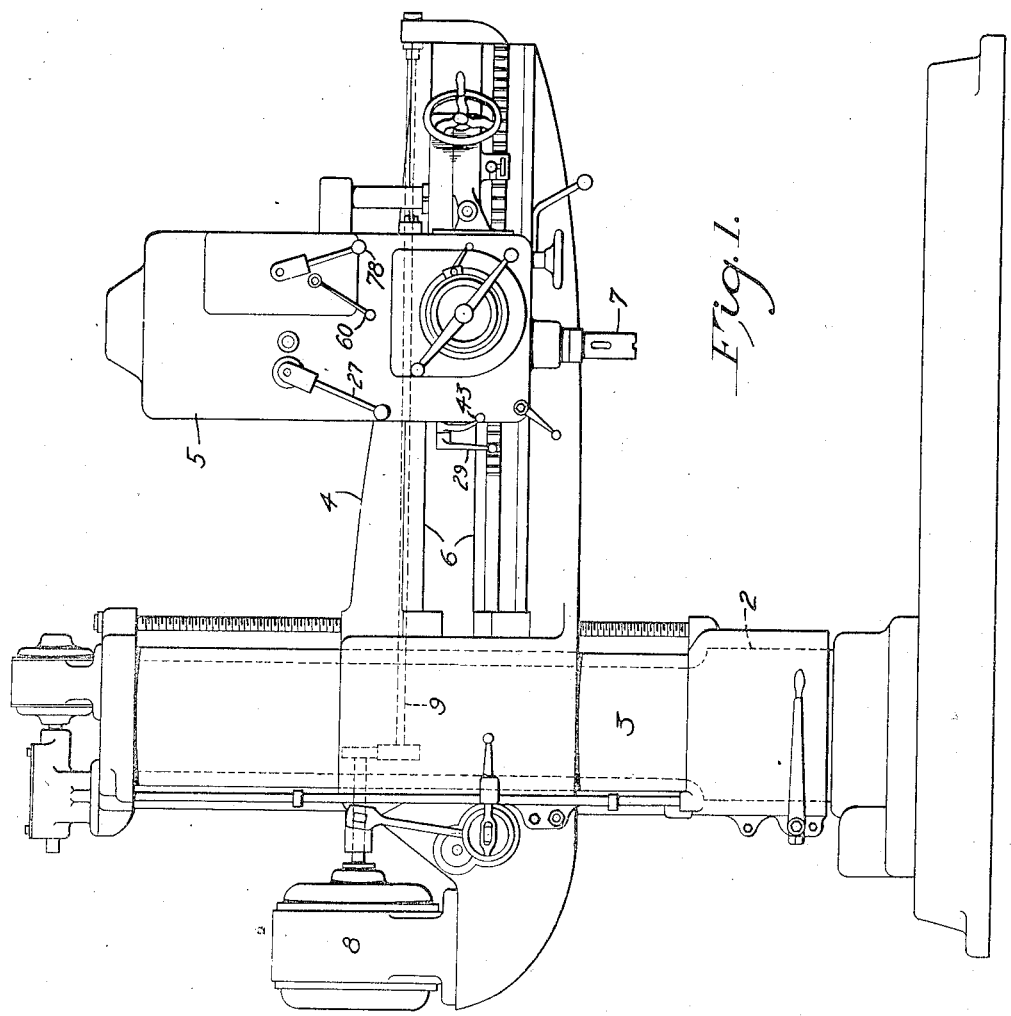

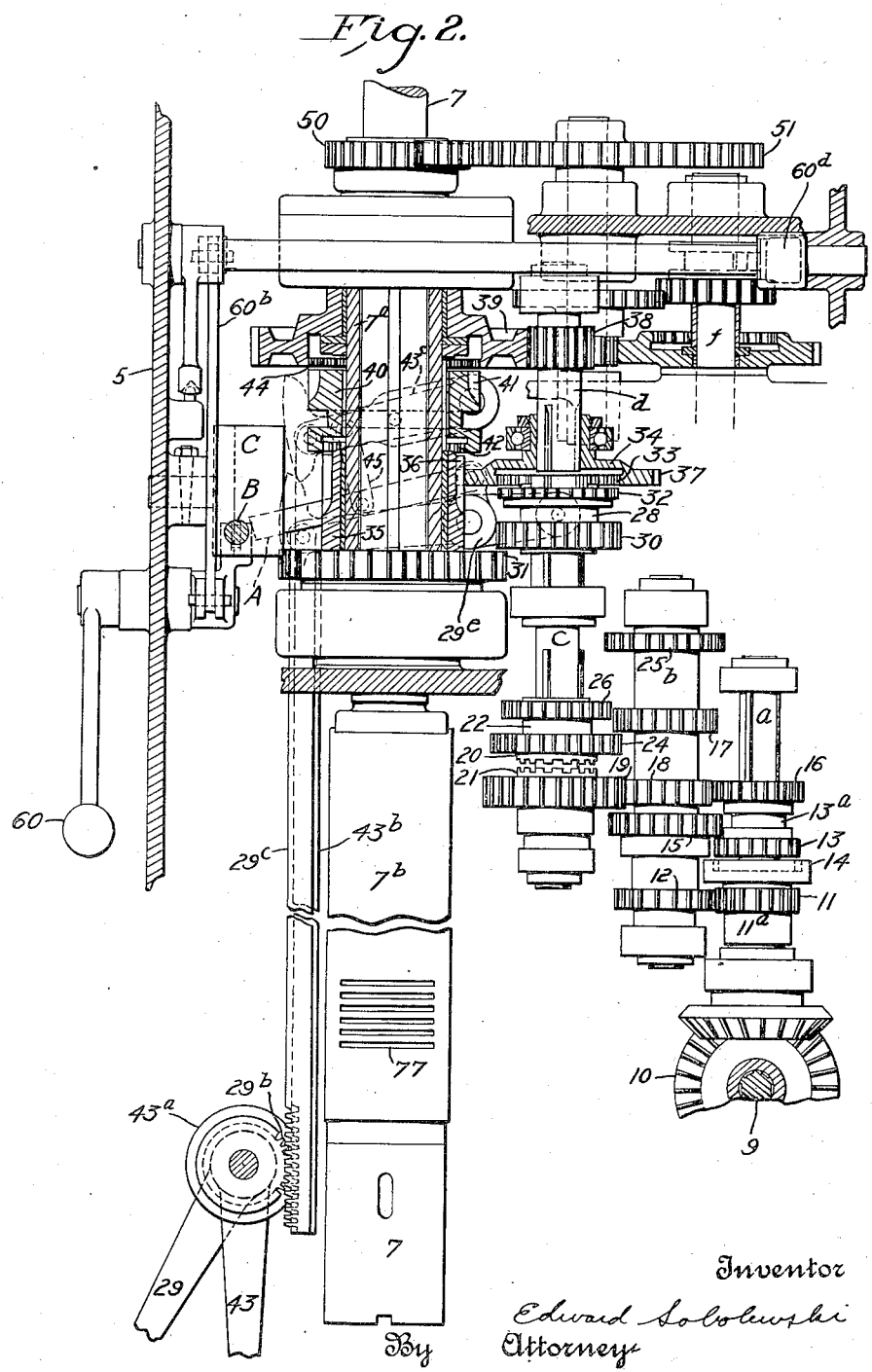

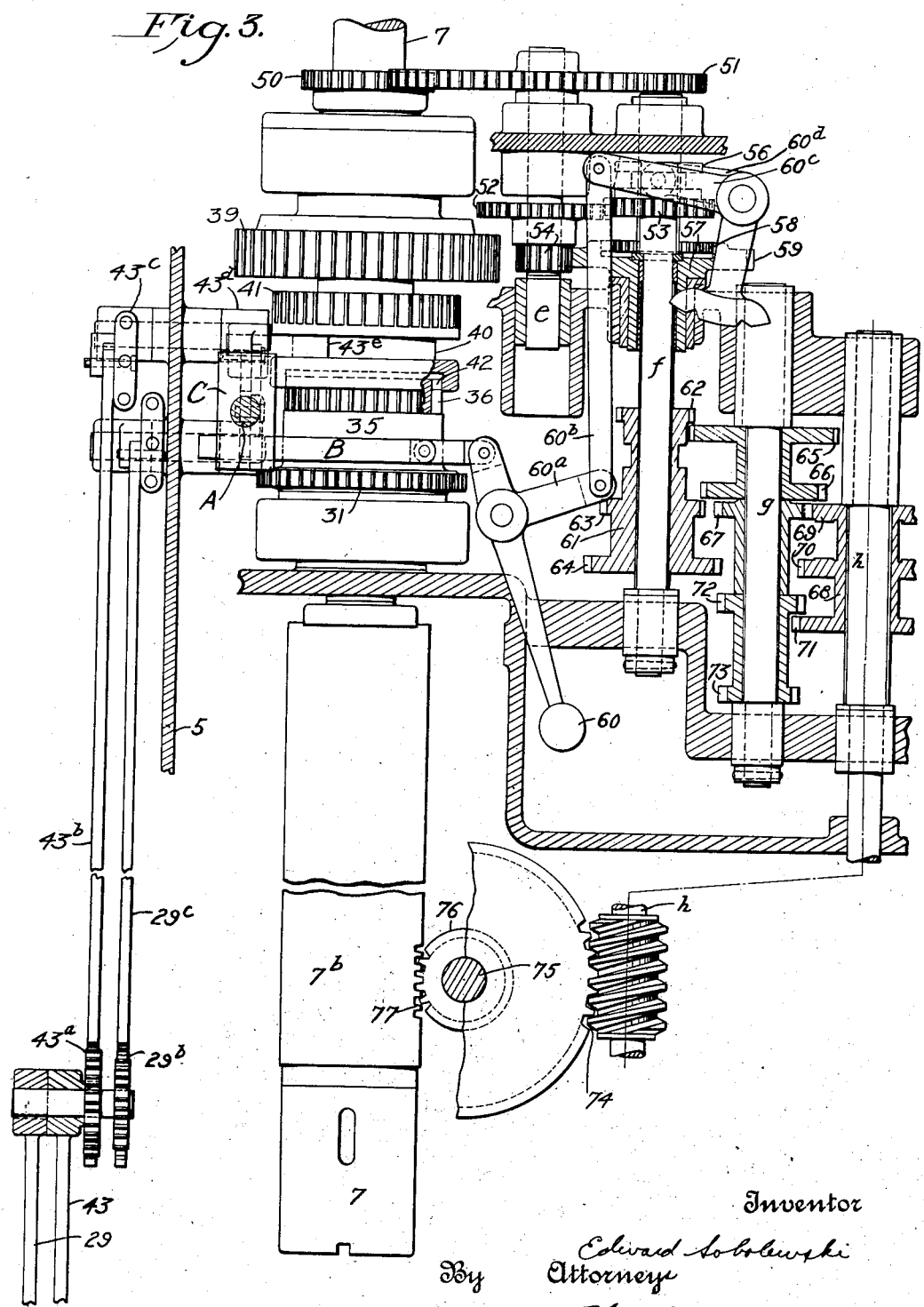

1,987,978

UNITED STATES PATENT OFFICE 1,987,978

BACK GEAR INTERLOCK

Edward Sobolewski, Cincinnati, Ohio, assignor to The Cincinnati Bickford Tool Company, Cincinnati, Ohio, a corporation of Ohio Application December 9, 1930, Serial No. 501,023

10 Claims. (Cl. 77—35)

This invention concerns multi-speed transmissions for machine tools, and particularly to mechanisms for feeding and rotating machine elements at various pre-selected speeds or rates.

It has for its primary object to provide a means for interlocking certain of the gears of the feed train with certain of the gears of the drive train to the end that a given feed rate may not be utilized whenever the gears of the drive train are positioned so as to effect a pre-selected speed of movement to the driven element.

A further object of this invention is to provide a machine tool having a plurality of selectable speeds in the drive train and a plurality of selectable speeds in the feed train, any one of which is adapted normally to cooperate with any selected speed of the other train to effect a given tooling operation, with an interlocking device effective only as between certain of the available speed and feed combinations to prevent the simultaneous or joint operation thereof.

A typical application of such an interlock is to the spindle driving and feeding transmission mechanism of a drilling machine, such as for example, of the radial arm type. In such a machine it is important that there be a multiplicity of spindle speeds, as well as spindle feeds, available for ready selection by the operator, to suit the demand or requirements of a particular class or character tooling operation. To illustrate, large boring and tapping operations are most efficiently performed at slow spindle speeds; for smaller work such as drilling small deep holes considerably higher spindle speeds are necessary. Likewise, with the feed mechanism, small hole drilling operations that require high spindle speeds also require a finer feed per revolution of the spindle than do the larger boring or reaming operations that require coarse or fast feeds per revolution of the spindle but lower spindle speeds. Therefore to construct a machine capable of performing any of the above functions a great many speeds and feeds must be incorporated in the one machine so as to render the same capable and flexible enough to cover the wide range and variety of work to which the machine may be subjected.

However, as in any machine tool incorporating a plurality of speeds and feeds, it is also important that the operator does not through inadvertence, accident or mistake select a coarse feed when utilizing a high spindle speed, or select a high spindle speed when gears of the feed train are intermeshed for effecting a fast feed, for under either condition, the resulting relative movement between the tool and work would be at a rate greatly in excess of the capacity of the tool or work and something must give way.

Therefore, in order to overcome this objectionable feature and to render the operation of the machine more safe and efficient this invention proposes to provide a means for effectively interlocking the high speed gears of the feed train with the high speed gears of the spindle rotating train and thereby provide a means for insuring against simultaneous operation of high speeds and high feeds and the consequent injury to the tools and/or the work piece.

In attaining these objects I propose to provide the control levers of a multi-speed transmission with devices, which, when moved to a pre-selected position by the shifting of a lever, interfere or intercept the free movement of other control devices when an attempt is made to move one or more of the last mentioned devices or the gears connected therewith to a given position, and conversely, and to so arrange the interlocking mechanism that either of the two sets of gears may be readily shifted to any of their respective positions, to obtain a pre-selected speed or feed, at all times excepting however, when certain of the gears of the other train have been previously positioned so as to effect a given rate or range of speeds or feeds.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a representative type of machine tool incorporating this invention. Fig. 2 is a developed sectional view of the spindle drive gearing mounted within the head of the machine illustrated in Fig. 1. Fig. 3 is a developed sectional view of the gears of the feed train and illustrating the back gear shifting mechanism. Fig. 4 is a fragmentary plan view, partly in section, of a portion of the head gearing, the interlocking members positioned so as to prevent the engagement of the gears necessary to effect high spindle speeds. Fig. 5 is a detail of the interference members in a position preventing engagement of high feed gears when the spindle is running at high speed. Figs. 6 and 7 are detail views of portions of the gear shifting mechanisms and the relative positions of their respective interference members.

Referring more particularly to Fig. 1, this invention is disclosed in connection with the transmission mechanism of a radial drill comprising the usual base member 1, column 2, a rotatable sleeve 3, an arm 4 translatable thereon and a drill head 5 movable along ways 6 formed on the arm. A rotatable and translatable spindle 7 is journaled in the head and is driven from a motor 8 mounted upon the arm through a constant speed arm shaft 9. A reversing mechanism, a portion of which is indicated generally at 10, transmits power from the arm shaft selectively in reverse directions to the spindle 7, entering the head at the rear thereof.

Referring to Fig. 2 it will be noted that power from the arm shaft 9 is transmitted to a splined shaft $a$ upon which a clutch gear unit 11$^a$ is loosely mounted and upon which a gear unit 13$^a$ is splined. When unit 13$^a$ is moved downwardly so as to engage clutch teeth 13 and 14 rotation of shaft $b$ is effected through the gears 11 and 12. Movement of the unit 13$^a$ upwardly one position engages gears 13 and 15; a further upward movement of the unit engages gears 16 and 17 and thus there are provided three speed changes between shafts $a$ and $b$. Between the shafts $b$ and $c$ there are provided three additional speed changes, constituting the secondary set, and making a total of nine thus far, as follows:—If the clutch gear unit 22 be moved downwardly so as to engage clutch teeth 20 and 21 power from shaft $b$ is transmitted to shaft $c$ through gears 18 and 19, but if the unit 22 be moved upwardly one position the power is transmitted through gears 17 and 24, while a still further movement of the unit upwardly engages the gears 25 and 26. The shifting forks, etc., for each of the units making up the primary and secondary change gear sets (which in this disclosure are utilized for effecting the finer increments of speed changes) have been omitted herein in the interests of clarity. Suffice it to say that a single control lever 27, having a total of nine positions, three radial positions in each of three different planes, controls the positioning and shifting of these gears.

The back gears, or those utilized for effecting the greater increments, or coarse speed changes, and those about which this application of this invention centers, are located adjacent the spindle and will now be explained.

The shaft $c$ also carries, splined thereto, a clutch gear element 28 adapted, upon the movement of lever 29 to engage gear 30 with gear 31 loose upon a sleeve 7$^a$ surrounding the spindle 7, or, clutch teeth 32 with clutch teeth 33 of the unit 34. Integral with the gear 31 is a sleeve member 35 having clutch-gear teeth 36 formed thereon and constantly in mesh with a gear 37 of the unit 34. Thus, when unit 28 is moved downwardly, any one of nine speeds in the shaft $c$ is transmitted through gears 30 and 31, 36 and 37 to the stub shaft $d$ and thence through pinion 38 to gear 39 which also is loose upon the spindle sleeve 7$^a$. A clutch element 40, provided with clutch teeth 41 and 42 is slidably keyed to the spindle sleeve 7$^a$, and is adapted upon movement of a second back-gear control lever 43 to engage clutch teeth 42 and 36 or clutch teeth 41 and 44. Upon movement of the clutch element 40 upwardly, gear 39 then becomes keyed to the spindle and the latter is rotated at relatively slow rates; if the clutch element 28 then be moved upwardly, power from the shaft $c$ will be transmitted directly to shaft $d$ through the clutch element 34, and thence to the spindle 7 through the elements 38, 39, 40 spindle sleeve 7$^a$, thereby rotating the spindle at faster rates.

A third possible position of the back gears adds nine speeds more to the spindle, in the following manner. If both of the clutch elements 28 and 40 are "down", power passes from the shaft $c$, through gears 30 and 31 to the clutch element 40, sleeve 7$^a$ and spindle 7. This position of the back gears causes the spindle to rotate at any one of nine speeds faster than any speed obtainable when the back gears are in either of the two positions previously explained.

Again, if the clutch element 28 be moved "up" and clutch 40 moved "down" power is transmitted from the shaft $c$ through gears 37 and 36, clutch element 40, sleeve 7$^a$ and spindle 7, causing the latter to turn any one of nine speeds faster than any of those heretofore mentioned, and which makes a total of 36 spindle speeds derived from the constant speed arm shaft.

Each of the clutch elements 28 and 40 are adapted to be independently shifted by means of the levers 29 and 43 respectively. The lever 29 through the rack and gear connection 29$^b$, bar 29$^c$, and levers 29$^d$ and 29$^e$ actuates the clutch shifting fork 28$^a$, which partially encircles an annular groove formed in the clutch element 28, to shift the latter "up", "down" or neutral as desired. Suitable detents 29$^f$ cooperating with appropriate spring pressed plungers hold the levers 29$^d$ and 29$^e$, and the clutch element connected therewith, in their adjusted positions.

The second element 40 is shifted in a similar manner, lever 43 carries a pinion 43$^a$ that meshes with rack teeth formed on a bar 43$^b$ the upper end of which is pivoted to a short lever 43$^c$. The lever 43$^c$ is connected with the lever 43$^d$ that carries the clutch shifting fork 43$^e$ and thus movement of the lever 43, moves the clutch element 40 "up" or "down" or to an intermediate or neutral position.

It will be remembered that in the last before mentioned positions of the back gear clutch elements 28 and 40, the spindle is caused to rotate at the relatively highest rates of speed and it is when the back gears are thus positioned that the danger of tool breakage or fractured work pieces is incurred if the operator selects, for simultaneous operation, a coarse feed. Therefore, means are provided, effective only in the high speed position of the back gears, to intercept the movement of the back gear feed control lever when an attempt is made to effect high feeds. With this end in view the second arm 29$^g$ of the bell crank clutch shifting lever 29$^e$ has attached thereto an interference bar A, see Figs. 2, 6 and 7 particularly, positioned so as to lie in the path of movement of a second interference member B which is attached to the feed control mechanism later to be explained. The bar A is also connected with the back gear clutch shifting lever 43$^d$ as by means of a link 45 so that both clutch elements 28 and 40 must be in a predetermined position before the bar A will interfere with the movement of the second interference bar B, or conversely. Thus, when clutch element 28 is "down", the end of bar A is moved toward the right (Fig. 6) and irrespective of the position of clutch element 40, the interference member A does not intercept the movement of member B; or if clutch 28 be moved "up", the bar A is moved to the left and if clutch 40 be also moved "up" (see dotted position in Fig. 7) there is likewise no interference. However, if clutch 28 is "up" and clutch 40 is "down" (full line position, Fig. 7), the end of the bar A falls in the path of movement of the interference member B which is operatively associated with the back gear feed control lever as will now be explained.

The feed drive is taken directly from a gear 50 mounted upon the spindle sleeve 7ª, consequently there exists a definite ratio between spindle speeds and feeds. Power from the spindle is transmitted to the feed works through the gear 51 mounted upon the shaft e. Gears 52 and 54, forming a part of the feed back gear train, are also mounted upon the shaft e and are adapted to transmit power to the shaft f at widely different rates through the medium of a clutch gear element 56. Loose upon the shaft f is a second clutch gear element 57 provided with complemental clutch teeth 58 and a gear wheel 59. When the parts are in the position shown in Fig. 2, power from the spindle 7 is transmitted through the gears 50, 51, 52 and 53 directly to the shaft f at a fast rate, but if the clutch element 56 is moved "down" the power passes through gears 54, 57 and the element 56 to the shaft f at a much slower rate. Thus, the feed back gears provide two initial speed changes for the feed train and which are each subdivided into finer divisions as will later become apparent.

Movement of the clutch element 56 is accomplished by a clutch actuator 60, located convenient to the operator, which, through lever 60ª, link 60ᵇ, arms 60ᶜ and 60ᵈ actuates the slutch shifting fork 60ᵉ of the element 56. When lever 60 is at the right, Fig. 2, relatively fast feeds are effected, when lever 60 is at the left, slow feeds are effective.

In order to provide the interlock between the high speeds and feeds and which will be effective only when clutch element 56 is "up" (fast feeds), the control lever 60, has attached thereto and movable therewith the interference bar B, which, in this position, Fig. 4, underlies or is in the path of movement of the interference bar A and prevents the speed back gear clutches 28 and 40 from being positioned to effect fast spindle speeds.

However, if feed clutch 56 be moved "down", thereby effecting slow feeds, the speed back gear clutches may be freely moved to any of the positions for effecting any of the spindle speeds hereinbefore explained.

Figures 5 and 7 are details of the ends of the interference members A and B when the gears are arranged for low feeds and high speeds, bar A in this position prevents movement of bar B toward the left, while the same details in Figs. 4 and 6 illustrate the position of the members when the high feed gears are operative and high speed gears inoperative. In this position interference bar B obstructs the movement bar A. The free ends of the members A and B are each supported by and translatably mounted in a block C secured to the drill head frame.

It is therefore seen that when either interference bar is in a position denoting high speeds or feeds, the other interference bar is effectively restrained from assuming a similar position and thereby provides a safety interlock between a plurality of gear change mechanisms which, obviously, may be applied to prevent various other gear combinations other than high speeds and feeds as by providing the interference bar B with one or more spaced slots according to the number of feed change speeds which are desired to be interlocked with the spindle speeds.

The remainder of the feed gear train is of conventional form and briefly is as follows: each of the two speeds transmitted from shaft e to shaft f is again subdivided. A gear unit 61 comprising gears 62, 63 and 64 splined to the shaft f is adapted to be shifted so as to selectively drive the shaft g through either of the gears 65, 66 and 67 mounted thereon. A fourth shaft or feed shaft h also carries a slidable gear unit 68 comprising gears 69, 70 and 71, which are adapted to be meshed selectively with their cooperative gears 67, 72 or 73 carried by the shaft g, making a total of eighteen individual speeds adapted to be transmitted to the feed shaft h for each spindle speed; nine relatively fast feeds and nine relatively slow feeds.

The conventional shifting forks, etc., for the selective positioning of the finer feed change gear sets (omitted from this disclosure in the interests of clarity) are operatively associated with a control lever 78 located at the front of the machine convenient to the operator.

A worm and worm wheel drive 74 transmit the power from the feed shaft h, to the shaft 75 and pinion 76 where the rotary motion is converted to translatory motion and moves the spindle 7 axially, the pinion 76 engaging rack teeth 77 formed on the non-rotatable but translatable spindle sleeve 7ᵇ.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A spindle driving transmission having initial and final speed changes in series; a control lever for the initial speed change and a control lever for the final speed change, each of said levers having a high and a low position; a variable speed feed transmission driven through said spindle driving transmission for the spindle; a third control lever for the feed transmission having a plurality of effective positions one of which is high; and means rendered effective upon the prepositioning of two of said levers to a given position, thereby to effect a predetermined rate of movement of the spindle, to prevent the movement of the other of said levers to a selected one of its effective positions.

2. A drilling machine having a tool spindle and a work support combining a variable speed spindle driving transmission having two sets of speed change gears in series, for rotating said spindle at preselected high and low rates of speed; two control elements for the respective sets of speed change gears in the spindle driving transmission, each of said elements having high and low speed positions; a variable speed spindle feed transmission and a control element therefor also having a high and a low speed position, said feed transmission being driven through said spindle rotating transmission; a power shaft for driving said transmissions; and means effective upon the concurrent positioning of any two of said control elements to coincident positions to prevent the setting of the third control element to a like position.

3. A spindle driving transmission having two speed rate changes in series; two control levers for effecting changes in speed rate, each of said levers having a high and a low speed position; a multi-speed feed transmission for the spindle, said feed transmission being in series with said spindle driving transmission; a third control lever having a high and a low speed position for the feed transmission; and interlocking control devices preventing any one of the said control levers from being moved to its high speed position while the other two levers are both in their respective high speed positions.

4. A spindle driving transmission having two rate change mechanisms in series; two control levers for effecting changes in rate of spindle speed each of said levers controlling one of said rate change mechanisms and having a high and a low speed position; a multi-speed feed transmission for the spindle, said feed transmission being driven through said spindle driving transmission; a third control lever having a high and a low speed position for the feed transmission; and interlocking control devices actuated by said levers for preventing the concurrent setting of all three of said levers to their respective high speed positions.

5. A power transmission combining a drive shaft and an element adapted to be rotated and translated therefrom; a plurality of serially arranged change gear mechanisms interposed between said drive shaft and said driven element adapted to impart rotary and axial movements to said element respectively at relatively high and low speeds, two of said serially arranged change gear mechanisms being arranged to impart one kind of movement to the said element and another of said serially arranged change gear mechanisms being adapted to impart the other mentioned kind of movement to the element; three independently operable control levers for controlling the rates of action of the three change gear mechanisms, each of said levers having high and low speed positions; and interlocking mechanism between the said three control levers effective upon the operation of two of said levers to a position effecting a predetermined rate of rotary or axial movement to said element to prevent the movement of the third lever to a position effecting a rate of rotary or axial movement to said element incompatible with the rate determined by the setting of the first two levers.

6. A power transmission combining a drive shaft and a rotary and axially movable element adapted to be driven therefrom; a plurality of change gear mechanisms interposed between said drive shaft and said driven element adapted to effect rotary and axial movements of said element respectively at relatively high and low speeds, the change gear mechanisms for rotating the said element being serially arranged; three control levers for the said change gear mechanisms, each having high and low speed positions; and interlocking mechanism between the said three control levers effective upon the positioning of two of said levers to a position effecting a predetermined rate of rotary or axial movement to said element to prevent the movement of the third lever to a position effecting a rate of rotary or axial movement to said element incompatible with the rate determined by the setting of the first two levers.

7. A multi-speed power transmission having two groups of change speed gearing therein adapted to impart rotary and translatory movements to an element adapted to perform operations on a workpiece, one of said groups of change speed gearing being driven through the other, and the said other being provided with two sets of speed change gears in series, the combination of a control lever having a high and a low speed position for one of said groups of change speed gearing, and a second and a third control lever for selectively positioning the gears of the said two sets of speed change gears in the other group of change speed gearing, each of said second and third levers also having high and low speed positions; and means interlocking said three levers to prevent their being positioned to positions effecting rotary and translatory movements to the driven element at rates which are incompatible with the nature of the operation to be performed by the driven element.

8. A power transmission for a machine tool spindle having change speed mechanisms therein adapted to impart rotary and translatory movements to the spindle, one of said change speed mechanisms being driven through the other, and the other of said change speed mechanisms being provided with two sets of serially arranged speed change means; the combination of a control lever having a high and a low speed position for one of said change speed mechanisms and a second and a third control lever for the two sets of speed change means in the other change speed mechanism, each of said second and third levers also having high and low speed positions; and means interlocking said three levers to prevent coincidental positioning thereof to positions effecting rotary and translatory movements of the tool spindle at rates incompatible with the nature of the tooling operation to be performed.

9. An interlock mechanism for preventing coincidental operation of the high spindle speed and feed gears of a power transmission in which the change speed gear mechanisms are serially arranged combining a plurality of control levers for controlling the positioning of the gears in said change speed mechanisms each of said levers having high and low speed positions; an interference member connected with one of said levers and adapted to be moved thereby; a second interference member having a pivotal connection with another of said levers and normally adapted to be moved thereby in the plane of movement of said first mentioned interference member and into and out of the path of movement of said first mentioned interference member; and means operatively connecting a third control lever with one of said interference members for moving same into and out of the said plane of movement, said members and connections being so arranged that when two of said levers are in positions effecting relatively high speeds of spindle movement one of said members obstructs the movement of the other so that its associated lever cannot be moved to its high speed position.

10. An interlock mechanism for preventing coincidental operation of selected spindle speed and feed gears of variable speed spindle driving and feeding power transmission, combining a plurality of control levers for controlling the positioning of the gears in said variable speed spindle driving and feeding transmission; an interference bar connected with one of said levers and adapted to be moved thereby; a second interference bar connected with another of said levers and normally adapted for movement in the plane of movement of said first mentioned interference bar and into and out of the path of movement of said first mentioned interference bar; and means connecting a third control lever with one of said interference bars for moving same into and out of said plane of movement, said bars and connections being so arranged that when two of said levers are in a position effecting a predetermined speed of spindle movement one of said bars obstructs the movement of the other and thereby restricts the movement of the lever connected therewith.

EDWARD SOBOLEWSKI.